(No Model.) 3 Sheets—Sheet 1.
H. A. TOBEY.
STEAM TRAP.
No. 333,032. Patented Dec. 22, 1885.
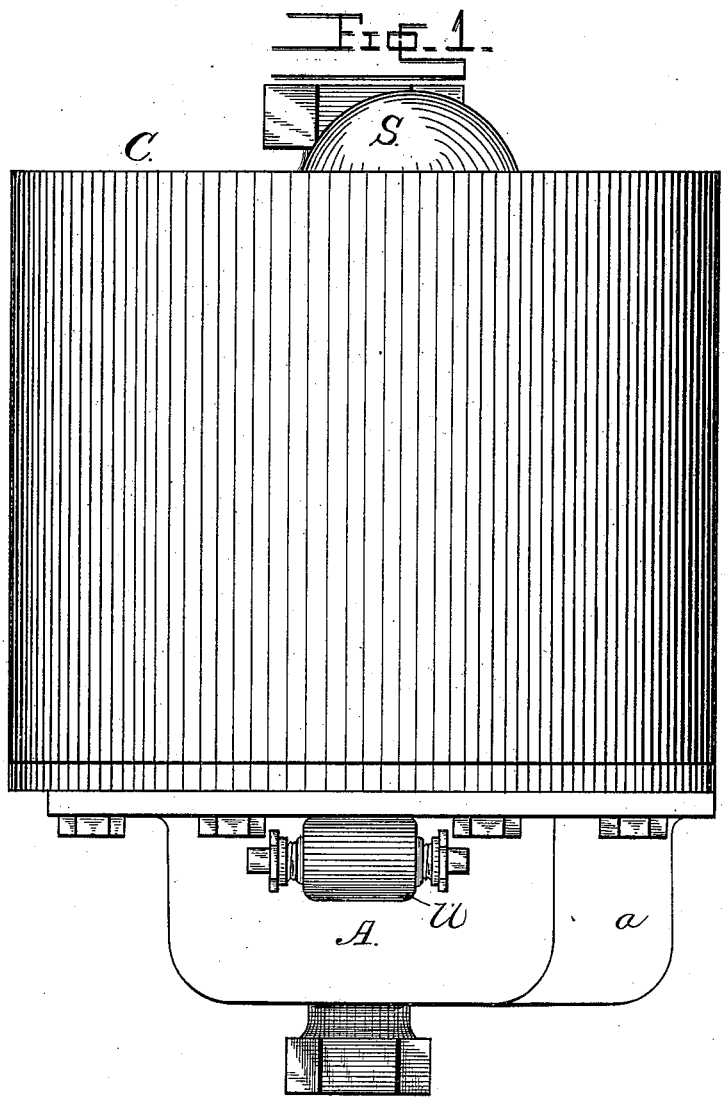
WITNESSES:
Jos. H. Blackwood
R. G. DuBois
INVENTOR
Henry A. Tobey
by W. A. Doolittle
Attorney

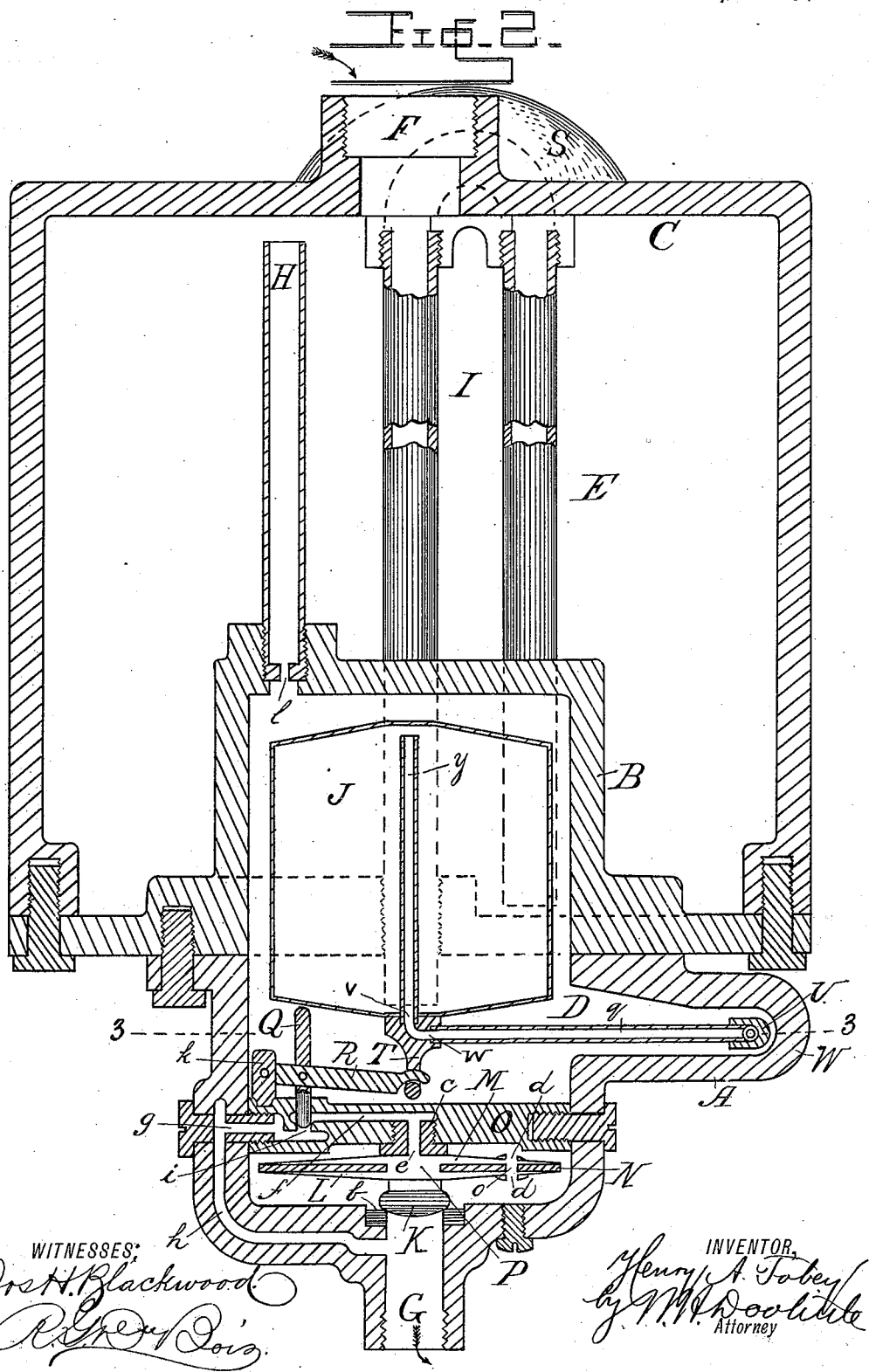

(No Model.) 3 Sheets—Sheet 3.
H. A. TOBEY.
STEAM TRAP.
No. 333,032. Patented Dec. 22, 1885.
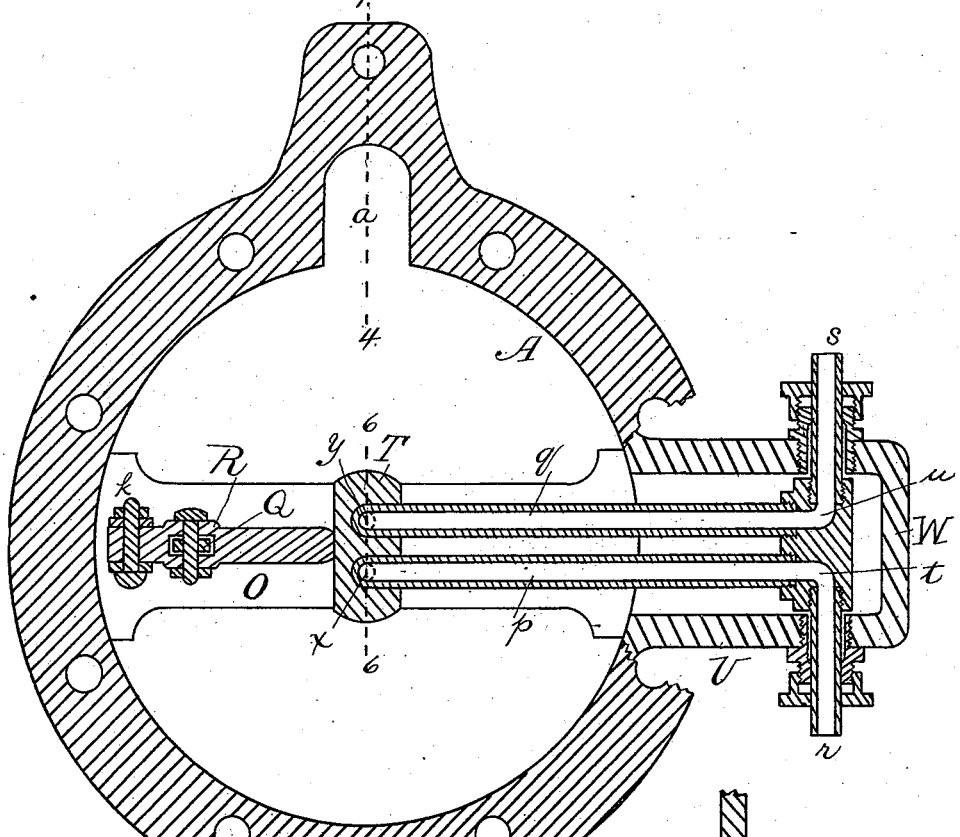
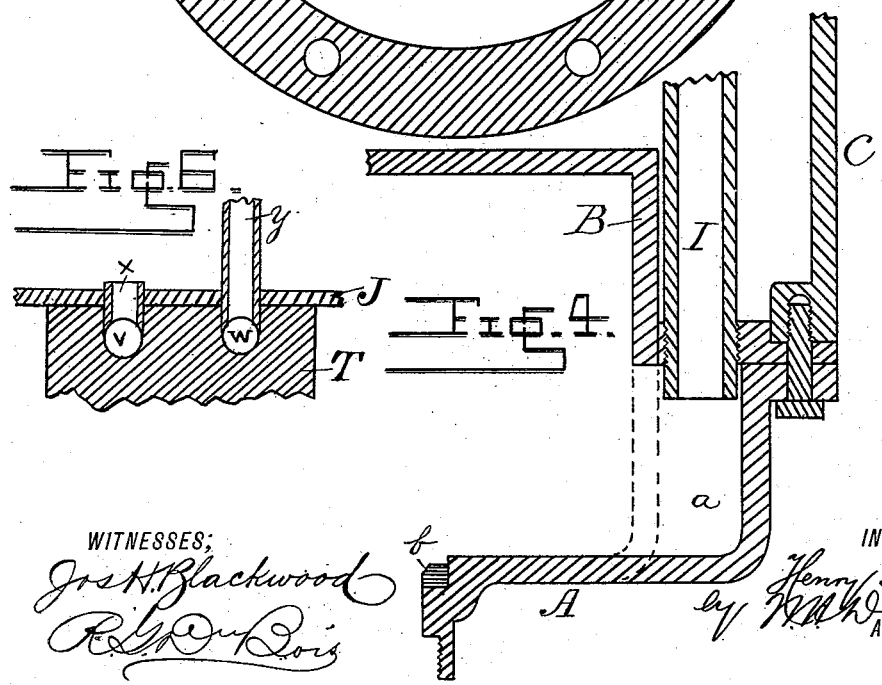
WITNESSES:
Jos. H. Blackwood
R. L. Du Bois
INVENTOR,
Henry A. Tobey
by R. M. Doolittle
Attorney
N. PETERS, Photo-Lithographer, Washington, D. C.

UNITED STATES PATENT OFFICE.

HENRY A. TOBEY, OF LIMA, OHIO.

STEAM-TRAP.

SPECIFICATION forming part of Letters Patent No. 333,032, dated December 22, 1885.

Application filed May 26, 1885. Serial No. 166,773. (No model.)

*To all whom it may concern:*

Be it known that I, HENRY A. TOBEY, a citizen of the United States, residing at Lima, in the county of Allen and State of Ohio, have invented certain new and useful Improvements in Steam-Traps; and I do hereby declare the following to be a full, clear, and exact description of the invention, such as will enable others skilled in the art to which it appertains to make and use the same.

In the ordinary steam-traps which are in common use, and in which a float is used to actuate the discharge-valve, the discharge-valve itself is usually acted upon by the float, and as it is subject to the full pressure within the trap the float, in order to raise it, has to be made proportionately very large, and consequently a very bulky chamber has to be provided for it to move in.

Another objection to the traps now in common use is that unless they are crowded to their entire capacity water collects in them just high enough to lift the float and valve a little, and is then discharged as fast as it collects in a thin sheet, between the valve and its seat, under the full pressure in the trap. The effect is that the continued action of this thin sharp stream soon cuts grooves in the valve and its seat, so that they will not fit each other, and the trap becomes practically worthless.

It has been established by practice that if a valve of any kind be so far opened that the area of its opening is substantially equal to the area of the inlet or outlet, as the case may be, it will be but little worn by the action of a flowing medium, while, on the contrary, wear rapidly increases as this area is proportionately lessened.

The main object of my improved trap is to overcome these objections.

In my improved trap the discharge-valve is opened and shut by means of a mechanism that is operated by a small auxiliary valve, which is controlled by a small float, that requires but little space, and, in connection with the valve and float arrangement or trap proper, an auxiliary or storage chamber is provided, which receives the water of condensation, and when filled it overflows into the trap or float chamber until the float is lifted and discharge-valve opened, which, when opened, instantly secures the pressure in the trap or float chamber and starts a siphon-connection from the storage-chamber to the trap-chamber that continues until all the water collected is discharged, and the discharge-valve then closes. The action of the trap is thus rendered intermittent, and the valve, when opened, is opened wide.

In addition to overcoming the objections named |my improved trap accomplishes other and important advantages, which will be hereinafter described.

In the accompanying drawings, Figure 1 is a side view of my improved trap. Fig. 2 is a central vertical section of the same. Fig. 3 is a horizontal section in a plane indicated by the line 3 3 in Fig. 2. Fig. 4 is a vertical section in a plane indicated by the line 4 4 in Fig. 3. Fig. 5 is a detail view of the discharge-valve-operating mechanism, and Fig. 6 is a vertical section in a plane indicated by the line 6 6, Fig. 3.

Like letters designate corresponding parts in all the figures.

The trap-casing consists of a bottom casting, A, an intermediate hat-shaped casting, B, and an upper casting, C, all securely bolted together. The intermediate casting, B, divides the trap into two compartments or chambers—a lower or float chamber, D, and an upper or water chamber, E. The inlet-pipe F enters the upper part of the casting C, and the outlet or discharge pipe G conducts from the bottom of the casting A. The water-chamber E communicates with the float-chamber D by means of a pipe, H, which reaches nearly to the top of chamber E and communicates with chamber D through the top of the casting B. The chambers D and E are further connected by a siphon-tube, I, which opens at one end near the bottom of the water-chamber, and its other end extends through the casting B into a bulged portion, *a*, of the float-chamber, so as not to interfere with the free movements of the float J, which nearly fills the upper portion of the float-chamber. The discharge-valve K, which closes the discharge-orifice, seats against a packing-ring, *b*, and is preferably spheroidal in shape, so that it may close the orifice when it is descends, whether it comes down square or not. This valve is secured to the convex side of a concavo-convex flexible and elastic disk or diaphragm, L, made of sheet-brass or other suitable material. This disk L and a similar disk, M, are circular in shape, and are secured at their edges to a circular double-concave plate, N. The upper disk, M, is secured by a bolt, c, to a bar, O, extending across the float-chamber D and secured at both ends to the casting A. The double-concave plate N is provided with a central aperture, and this aperture, together with the spaces between the plate and the concave surface of the disks L M, constitute a chamber, P, which may be termed the "auxiliary pressure-chamber." The disks L M are each provided with a small orifice, d, which establishes communication between the float-chamber and the auxiliary pressure-chamber, so that when the discharge-valve is closed the pressure is the same in the two chambers. The chamber P communicates with the discharge-pipe G by means of passage e in bolt c, passages f and g in the bar O, and passage h in the casting A. The passages f and g in the bar O are connected by an orifice, i, the area of which is considerably greater than the combined area of the orifices d d in the disks L M. This orifice i, which is also quite small, is normally closed by a piston-valve, Q. To this valve is pivoted a lever, R, which at one end is pivoted to a bracket, k, on the cross bar O, and is acted upon at the other end by the float J.

The operation is as follows: The discharge-valve K and the auxiliary valve Q being closed, the float J down, the chambers D and E empty, and the pressure throughout the trap being the same, water enters the water-chamber E through inlet F. The water collects in chamber E and fills the same until its level reaches the upper opening of pipe H. The water then begins to flow down pipe H into float-chamber D, and as chamber D fills it raises float J. The raising of float J lifts piston-valve Q, uncovering orifice i, thus establishing communication between the auxiliary pressure-chamber P and the space below the discharge-valve K. The pressure in chamber P being thus relieved, and the pressure medium being discharged through orifice i much more rapidly than it can be admitted through orifices d d, the pressure in chamber P becomes much less than that in chamber D, the result being that the greater external pressure on the elastic disks L M collapses them against the double-concave plate N, and thus the discharge-valve K is raised at once instantly and entirely from its seat, and the whole distance, valve K being opened, the water in the float-chamber D begins to discharge rapidly through discharge-pipe G. The aperture l in the lower end of pipe H, where it communicates with float-chamber D, is much smaller in area than the discharge-aperture at pipe G. The consequence is that the water is discharged much more rapidly from float-chamber D than it enters therein, the immediate result being that the pressure in the float-chamber becomes much less than that in the water-chamber E.

The greater pressure in chamber E forces the water over the bend in siphon-tube I, starting its siphoning action, and the water is discharged rapidly through this tube into chamber D and out through pipe G until the chamber E is entirely emptied. The chamber E being emptied and no more water entering float-chamber D, the latter begins to empty, and float J to descend. In descending, float J engages valve Q and presses it back against its seat, thus covering orifice i and cutting off communication between chamber P and outlet G. This communication being closed, the pressure in chambers P and D becomes equalized through orifices d d. The outward pressure on disks L M being thus removed, their elasticity opens them, thus closing the valve K and returning the various parts to their original positions.

In order that the bend in the siphon-tube I may be above the level of the water in the water-chamber when it overflows into the pipe H, the casting C is formed on its top with an upwardly-extending dome, S, into which the bend of the siphon-tube extends.

If the concave faces of the plate N were perfectly smooth, it might happen, when the disks L M were pressed against it during the discharge of the water, that they would be flat against it, and so prevent the entrance of the pressure medium to the chamber P through orifices d d. To prevent this, and at the same time to provide an instantaneous circulation of the pressure medium between the plate and disks, the concave faces of the plate are formed with radial grooves m m, extending from the central aperture outward. In case the orifices d d should become clogged by any means, a removable plug is provided in the casing A, directly beneath them, and through the opening left when the plug is removed a suitable instrument may be inserted to clean the orifices.

In order that access may be had to both orifices from beneath, they are arranged directly in line, and the plate N is provided with an aperture, o, between them.

The float J is not directly secured to the long arm of the lever R which connects it with the valve Q, since in that case the multiplied weight of the float (owing to the leverage) would press down upon the valve, and might possibly press it too firmly against its seat. In order to prevent this, the float is provided with a downwardly-extending link, T, in which the end of the lever R is held. Consequently the float rests directly upon the valve Q and holds it down with its own weight only. The float J is held in position by an arm composed of two small pipes, p and q. These pipes enter at one end the casting T, which constitutes the lever-connecting link, and at the other end they enter a casting, U, which is pivoted in the sides of a projection, W, of the casting A. The bearings of the casting U are properly packed, are tubular, and connect with pipes r and s. The casting U is itself provided with two channels, t and u, by which the pipes p and q communicate with the pipes r and s, respectively.

The link-casting T is provided with channels v and w, by which the pipes p and q communicate, respectively, with pipes x and y, which enter the bottom of the float. The pipe x is a short one and terminates at the bottom of the float, and through this pipe is discharged any water which may accumulate in the float, while the pipe y extends nearly to the top of the float and admits air to the float to replace the water as it escapes. The float as it rises and falls turns on the bearings of the casting U in the projection W, and its movement may thus be observed from the exterior of the trap, and this movement may be utilized to measure and record the amount of water discharged by the trap.

From the description of the operation of the trap it will be noted that no water enters the float-chamber until the water-chamber is full and the amount of water in the float-chamber necessary to raise the float sufficiently to open the valves is a constant amount. When the water once begins to discharge, it discharges very rapidly and always the same amount, which is the combined capacity of the water and float chambers. The capacity of the two chambers having been determined, the automatic measurement of the amount of water discharged can be readily accomplished. With every rise and fall of the float the contents of the chambers discharge, and as this rise and fall is rendered observable from the exterior of the trap by the casting U it is very evident that by connecting any well-known registering devices to the exterior portion of the shaft of the casting U a record of the amount discharged can be easily ascertained.

The mechanism for raising the discharge-valve, composed of the elastic disks and the intermediate double-concave plate, can be equally well used in any place where a balanced or easily-operated valve is required.

I claim as my invention—

1. In a steam-trap, an upper water-chamber, a lower float-chamber, an inlet to said water-chamber, and an outlet from said float-chamber, in combination with a discharge-pipe connecting said water and float chambers, which discharges water from said water-chamber to said float-chamber only when said water-chamber is full, or nearly so, a siphon-discharge tube connecting said two chambers, a valve closing the discharge-outlet leading from said float-chamber, and a float in said float-chamber which controls said discharge-valve, substantially as set forth.

2. In a steam-trap, an upper water-chamber, a lower float-chamber, a siphon-tube connecting said chambers, an inlet to said water-chamber, an outlet from said float-chamber, a valve which closes said outlet, and a float in said float-chamber which controls said valve, in combination with a pipe connecting said float and water chambers, which pipe commences to discharge water from said water-chamber to said float-chamber only when said water-chamber is full, or nearly so, said pipe having a discharge-orifice of a smaller area than that of the discharge-outlet leading from said float-chamber, substantially as set forth.

3. In a steam-trap, a float-chamber and a discharge-outlet leading therefrom, in combination with an auxiliary pressure-chamber, an elastic or flexible disk or diaphragm forming one side of said chamber, a valve adapted to said discharge-outlet, connected to said elastic disk, an orifice connecting said auxiliary pressure-chamber with said float-chamber, a passage leading from said auxiliary chamber to beneath said outlet-controlling valve, an auxiliary valve adapted to said passage, and a float in said float-chamber which controls said auxiliary valve, substantially as set forth.

4. In a steam-trap, a float-chamber, a discharge-outlet leading therefrom, an auxiliary pressure-chamber, an elastic diaphragm forming one side of said auxiliary chamber, a valve controlling said outlet connected to said diaphragm, and an orifice connecting said auxiliary and float chambers, in combination with a passage leading from said auxiliary chamber to the outlet beneath its controlling-valve, a valve-orifice located in said passage, having an area greater than the area of the orifice connecting the auxiliary and float chambers, an auxiliary valve controlling said valve-orifice, and a float in said float-chamber which controls said auxiliary valve, substantially as set forth.

5. In a steam-trap, a float-chamber, a discharge-outlet leading therefrom, and a cross-bar located in said chamber, in combination with two elastic concavo-convex disks secured together at their edges, whereby an auxiliary pressure-chamber is formed between them, the upper of said disks being secured to said cross-bar, a valve controlling said discharge-outlet, secured to the lower of said disks, an orifice in one or both of said disks establishing communication between said float-chamber and said auxiliary chamber, a passage which leads from said auxiliary chamber to the discharge-outlet beneath its controlling-valve, an auxiliary valve which controls said passage, and a float in said float-chamber which actuates said auxiliary valve, substantially as set forth.

6. A valve-controlling mechanism which consists of a double-concave plate having an aperture or apertures therethrough, in combination with two concavo-convex elastic disks secured at the edges to said plate, with their concave faces toward the plate, to one of which disks the valve is secured, substantially as set forth.

7. A valve-controlling mechanism which consists of a double-concave plate having a central aperture, and with radial grooves on its surface, which extend from said aperture, in combination with two concavo convex elastic disks secured at the edges to said plate, with their concave faces toward the plate, to one of which disks the valve is secured, substantially as set forth.

8. In a steam-trap, a valve-controlling mechanism for the discharge-outlet valve located within said trap, which mechanism consists of a central plate and two elastic disks secured to opposite sides of said plate, each disk being formed with an orifice, and the plate being formed with an aperture in the same line with said orifices, in combination with a removable plug in said trap-casing in line with the orifices and aperture in said valve-controlling mechanism, substantially as set forth, whereby access may be had to said orifices to cleanse the same.

9. In a steam-trap, a valve and a lever pivoted at one end to a fixed support and pivoted to said valve, in combination with a float and a downwardly-extending open link attached to said float, which link embraces the free end of said valve controlling lever, but is not attached thereto, substantially as set forth.

10. In a steam-trap, a float and a casting having tubular bearings extending outward through said trap-casing, in combination with two pipes connecting said float to said casting, one of said pipes opening at the bottom of said float and the other near the top thereof, substantially as set forth, whereby water may be discharged from said float through one of said pipes, and air may be admitted through the other.

11. In a steam-trap, a water-chamber, a float-chamber, an inlet to said water-chamber, an outlet from said float-chamber, a valve controlling said outlet, a pipe opening at its upper end near the top of said water-chamber and opening at its lower end into said float-chamber, and a siphon-tube connecting said water and float chamber, in combination with a float in said float-chamber which controls said discharge-valve, and a casting having bearings which extend through the trap-casing, to which casting said float is connected, substantially as set forth.

In testimony whereof I affix my signature in presence of two witnesses.

HENRY A. TOBEY.

Witnesses:
W. L. MACKENZIE,
W. L. PORTER.